United States Patent
Frost et al.

(10) Patent No.: US 6,880,285 B1
(45) Date of Patent: Apr. 19, 2005

(54) COMBINED BOBBER AND HOOK-SETTING ASSEMBLY

(76) Inventors: Bonnie L. Frost, 1002 Inverness St., Peoria, IL (US) 61615; Robert E. Frost, 1002 Inverness St., Peoria, IL (US) 61615

( * ) Notice: Subject to any disclaimer, the term of this patent is extended or adjusted under 35 U.S.C. 154(b) by 0 days.

(21) Appl. No.: 10/844,113

(22) Filed: May 13, 2004

(51) Int. Cl.⁷ .......................... A01K 91/10; A01K 93/00
(52) U.S. Cl. .......................................... 43/15; 43/43.11
(58) Field of Search .............................. 43/15, 16, 43.11

(56) References Cited

U.S. PATENT DOCUMENTS

| | | | | |
|---|---|---|---|---|
| 384,853 A | * | 6/1888 | Keller | 43/15 |
| 625,829 A | * | 5/1899 | Cook | 43/15 |
| 1,524,011 A | * | 1/1925 | Ballew | 43/15 |
| 1,962,232 A | * | 6/1934 | Clairon | 43/15 |
| 1,973,028 A | * | 9/1934 | Thomas | 43/43.11 |
| 1,975,385 A | * | 10/1934 | Bachus | 43/15 |
| 2,064,428 A | * | 12/1936 | Hathaway | 43/15 |
| 2,316,074 A | * | 4/1943 | Kimbrough | 43/44.87 |
| 2,374,752 A | * | 5/1945 | Johnson | 43/15 |
| 2,461,356 A | * | 2/1949 | Sus et al. | 43/16 |
| 2,479,399 A | * | 8/1949 | Patten | 43/15 |
| 2,545,385 A | * | 3/1951 | Reppert et al. | 43/15 |
| 2,577,552 A | * | 12/1951 | White, Jr. | 43/15 |
| 2,606,385 A | * | 8/1952 | Laurito | 43/15 |
| 2,669,054 A | * | 2/1954 | Smith, Sr. | 43/43.11 |
| 2,747,317 A | * | 5/1956 | Blaskow | 43/15 |
| 2,799,114 A | * | 7/1957 | Turner | 43/43.11 |
| 2,801,487 A | * | 8/1957 | Morgan | 43/15 |
| 2,804,715 A | * | 9/1957 | Kimbrough | 43/44.87 |
| 2,807,115 A | * | 9/1957 | Turner | 43/43.11 |
| 2,860,442 A | * | 11/1958 | Turner | 43/43.11 |
| 2,984,040 A | * | 5/1961 | Fogaley | 43/43.11 |
| 3,084,468 A | * | 4/1963 | Christophel | 43/43.11 |
| 3,105,318 A | * | 10/1963 | Birrell | 43/43.15 |
| 3,141,256 A | * | 7/1964 | McBriar | 43/43.11 |
| 3,174,247 A | * | 3/1965 | Morgan | 43/15 |
| 3,364,613 A | * | 1/1968 | Sewell | 43/43.11 |
| 3,611,613 A | * | 10/1971 | Perches | 43/43.11 |
| 3,613,289 A | * | 10/1971 | Wehren | 43/43.11 |
| 3,660,922 A | * | 5/1972 | Chill | 43/15 |
| 3,672,087 A | * | 6/1972 | Milburn, Jr. | 43/44.88 |

(Continued)

FOREIGN PATENT DOCUMENTS

| | | | | |
|---|---|---|---|---|
| CA | 459898 B1 | * | 9/1949 | 43/15 |
| CA | 609396 B1 | * | 11/1960 | 43/43.11 |
| DE | 3816875 A1 | * | 9/1988 | |
| FR | 2310091 A1 | * | 1/1977 | |
| FR | 2648673 A1 | * | 12/1990 | |
| GB | 1401157 A1 | * | 7/1975 | |
| GB | 2263851 A1 | * | 8/1993 | |
| GB | 2354148 A1 | * | 3/2001 | |
| JP | 9-37692 B1 | * | 2/1997 | |
| JP | 10-178995 B1 | * | 7/1998 | |
| JP | 11-4644 B1 | * | 1/1999 | |
| JP | 11-243823 B1 | * | 9/1999 | |
| JP | 2003-169574 B1 | * | 6/2003 | |
| WO | WO-97/00009 A1 | * | 1/1997 | |
| WO | WO-02/30186 A1 | * | 4/2002 | |

*Primary Examiner*—Darren W. Ark

(57) ABSTRACT

A combined bobber and hook-setting assembly for automatically setting a hook into a mouth of a fish upon the fishing striking the hook. The combined bobber and hook-setting assembly includes a spherical member having holes disposed therethrough; and also includes a grommet being attached to the spherical member and being adapted to connect to a fishing line; and further includes a reel assembly being disposed in the spherical member and including an elongate support member being attached to an interior of the spherical member, and also including a spool being rotatably mounted upon the elongate support member, and further including a flexible line being carried about the spool and being retractably extended through one of the holes of the spherical member and being connect to a baited hook.

5 Claims, 3 Drawing Sheets

U.S. PATENT DOCUMENTS

| | | | | |
|---|---|---|---|---|
| 3,673,729 A | * | 7/1972 | Lintz | 43/43.11 |
| 3,766,680 A | * | 10/1973 | Torme et al. | 43/16 |
| 3,823,501 A | * | 7/1974 | Bybee | 43/15 |
| 3,878,634 A | * | 4/1975 | Quimpo | 43/15 |
| 4,109,404 A | * | 8/1978 | Preeschl | 43/17 |
| 4,251,941 A | * | 2/1981 | Howard | 43/43.11 |
| 4,658,532 A | * | 4/1987 | McFarland et al. | 43/44.87 |
| 4,825,580 A | * | 5/1989 | Gray | 43/43.11 |
| 5,068,995 A | * | 12/1991 | Rinehart | 43/17 |
| 5,440,831 A | * | 8/1995 | Chandler | 43/43.11 |
| 5,528,851 A | * | 6/1996 | Feher | 43/44.87 |
| D396,521 S | * | 7/1998 | Brackett, Sr. | D22/146 |
| 6,105,299 A | * | 8/2000 | Rich | 43/15 |
| 6,173,524 B1 | * | 1/2001 | Kinchen, Sr. | 43/44.92 |
| 6,487,811 B1 | * | 12/2002 | Barrett | 43/43.11 |

* cited by examiner

COMBINED BOBBER AND HOOK-SETTING ASSEMBLY

BACKGROUND OF THE INVENTION

1. Field of the Invention

The present invention relates to combined bobbers and hook-setters and more particularly pertains to a new combined bobber and hook-setting assembly for automatically setting a baited hook into a mouth of a fish upon the fishing striking the baited hook.

2. Description of the Prior Art

The use of combined bobbers and hook-setters is known in the prior art. More specifically, combined bobbers and hook-setters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,109,404; 3,672,087; 3,766,680; 5,068,995; 6,173,524, and U.S. Pat. No. Des. 396,521.

While these devices fulfill their respective, particular objectives and requirements, the aforementioned patents do not disclose a new combined bobber and hook-setting assembly. The prior art includes bobbers having hook setting mechanisms.

SUMMARY OF THE INVENTION

The general purpose of the present invention, which will be described subsequently in greater detail, is to provide a new combined bobber and hook-setting assembly which has many of the advantages of the combined bobbers and hook-setters mentioned heretofore and many novel features that result in a new combined bobber and hook-setting assembly which is not anticipated, rendered obvious, suggested, or even implied by any of the prior art combined bobbers and hook-setters, either alone or in any combination thereof. The present invention includes a spherical member having holes disposed therethrough; and also includes a grommet being attached to the spherical member and being adapted to connect to a fishing line; and further includes a reel assembly being disposed in the spherical member and including an elongate support member being attached to an interior of the spherical member, and also including a spool being rotatably mounted upon the elongate support member, and further including a flexible line being carried about the spool and being retractably extended through one of the holes of the spherical member and being connected to a baited hook. None of the prior art includes the combination of elements of the present invention.

There has thus been outlined, rather broadly, the more important features of the combined bobber and hook-setting assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new combined bobber and hook-setting assembly which has many of the advantages of the combined bobbers and hook-setters mentioned heretofore and many novel features that result in a new combined bobber and hook-setting assembly which is not anticipated, rendered obvious, suggested, or even implied by any of the prior art combined bobbers and hook-setters, either alone or in any combination thereof.

Still another object of the present invention is to provide a new combined bobber and hook-setting assembly for automatically setting a hook into a mouth of a fish upon the fishing striking the hook.

Still yet another object of the present invention is to provide a new combined bobber and hook-setting assembly that are easy and convenient to set up and use.

Even still another object of the present invention is to provide a new combined bobber and hook-setting assembly that allows the fish to take the baited hook which releases the spool-locking member that automatically sets the baited hook in the mouth of the fish so that the fish is then reeled in.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
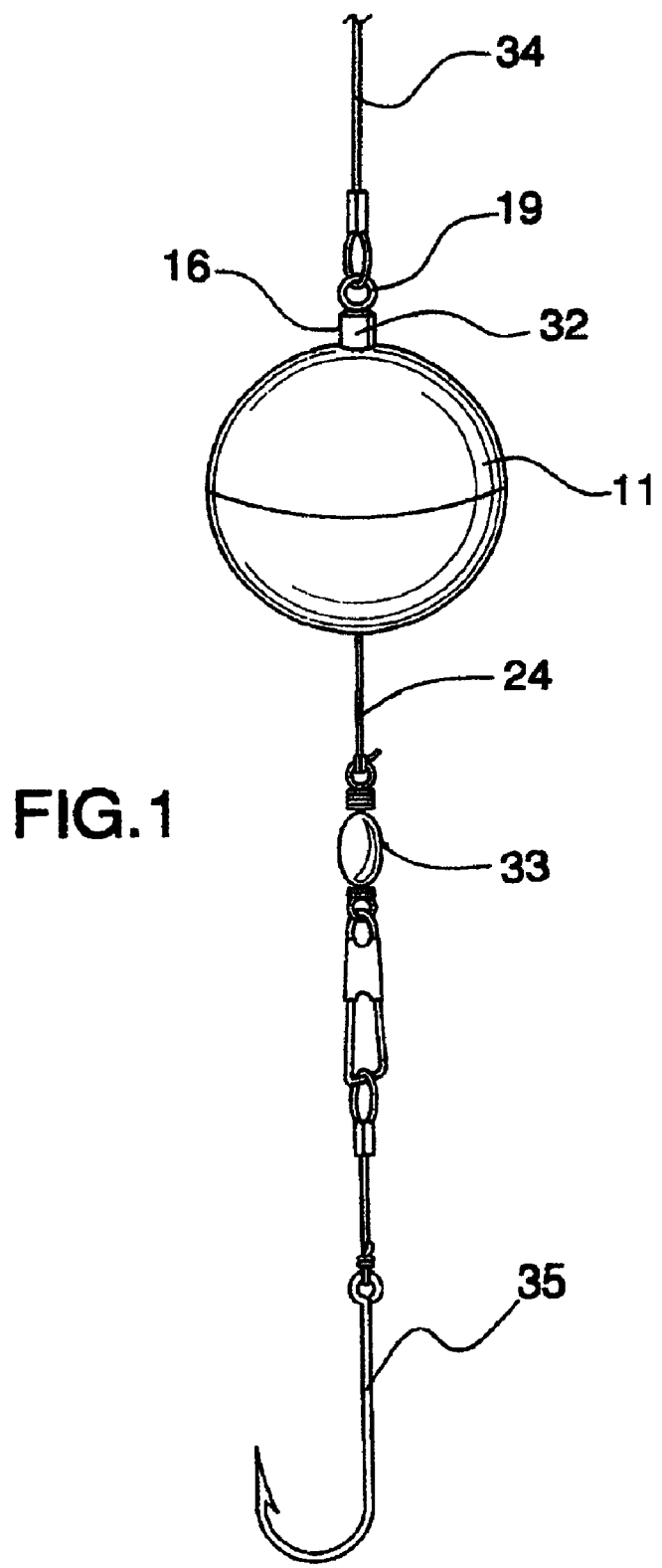
FIG. 1 is a front elevational view of a new combined bobber and hook-setting assembly according to the present invention.
Figure 2:
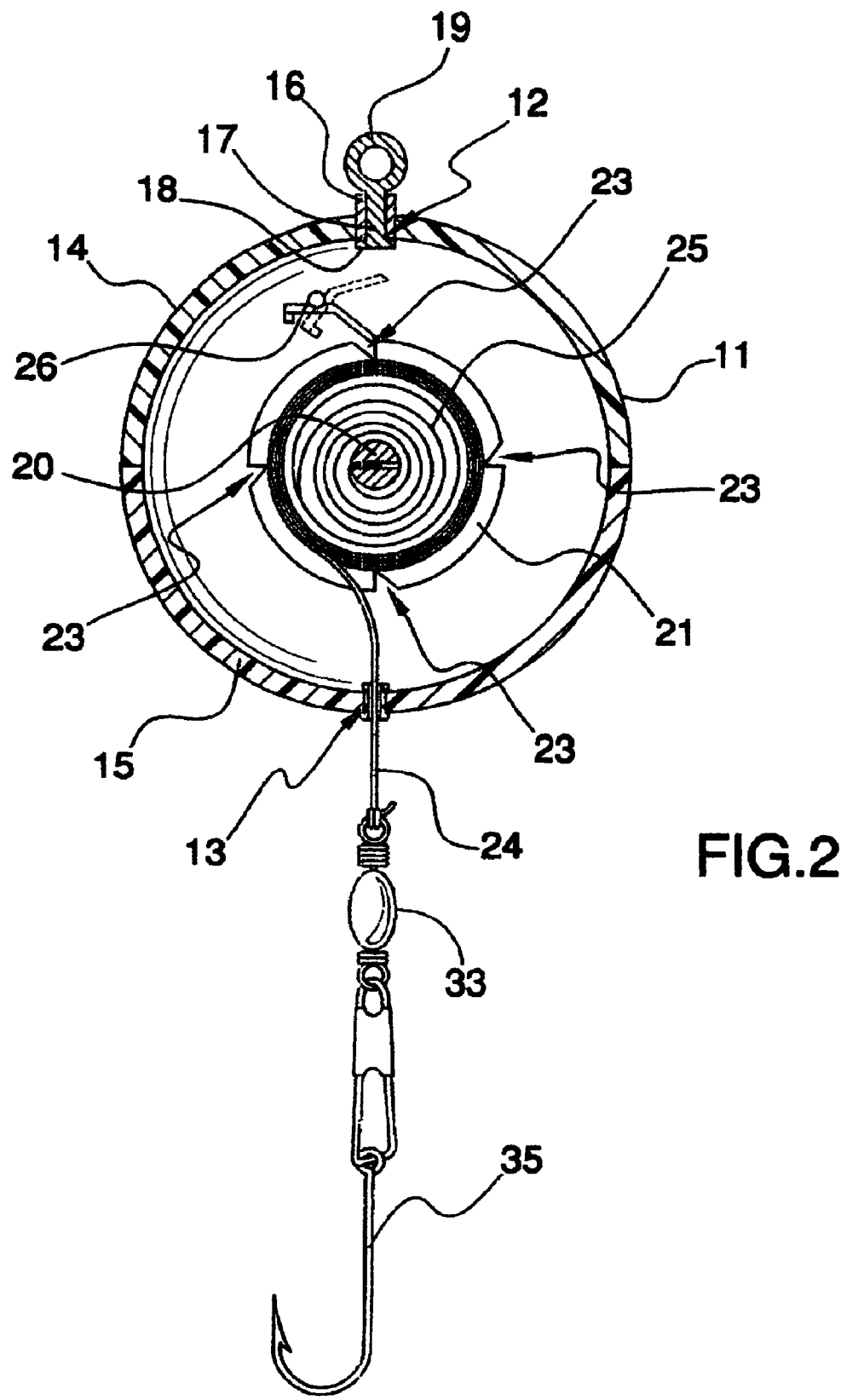
FIG. 2 is a partial perspective view of the present invention.
Figure 3:
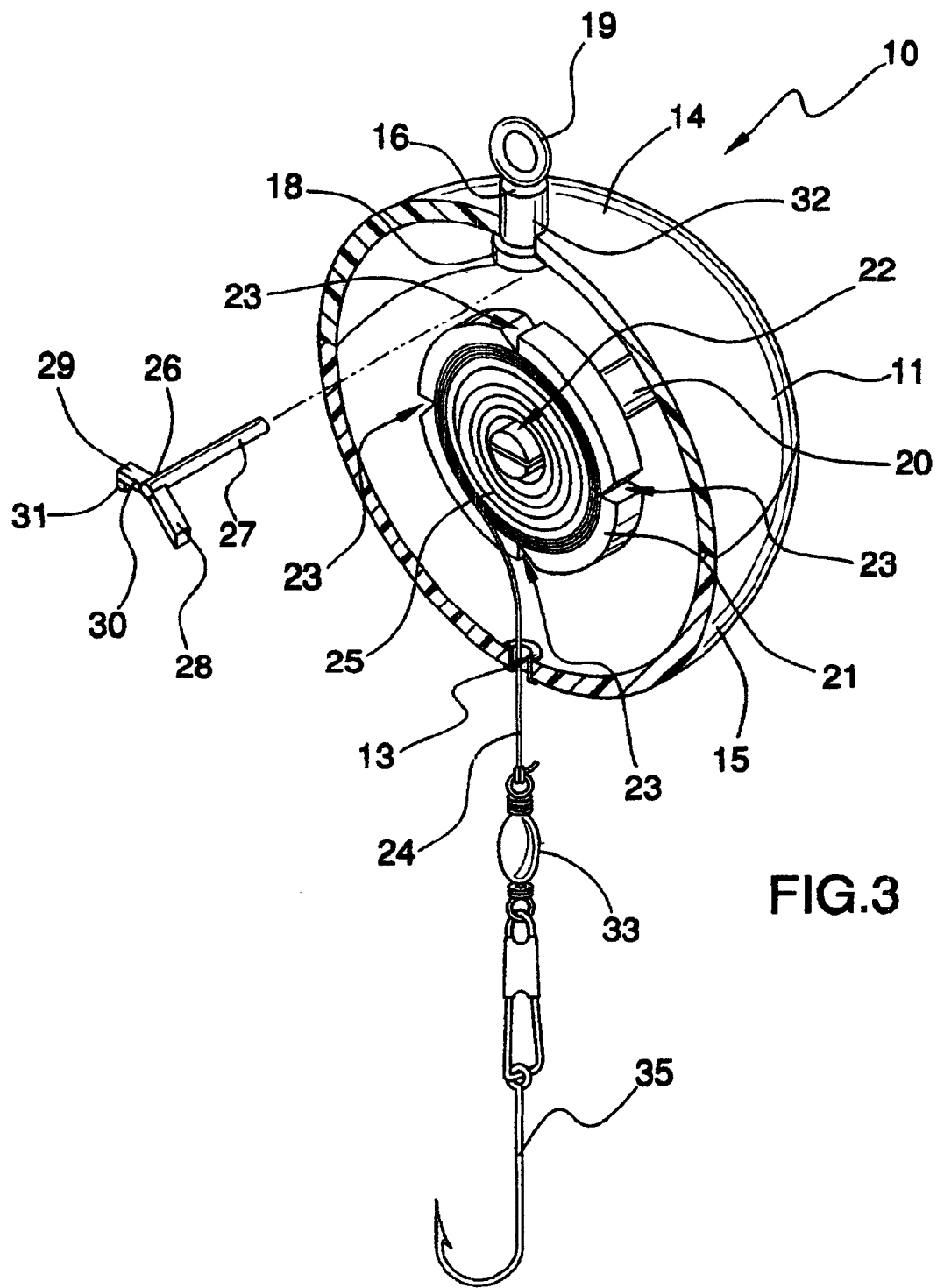
FIG. 3 is a cross-sectional view of the present invention.

With reference now to the drawings, and in particular to FIGS. 1 through 3 thereof, a new combined bobber and hook-setting assembly embodying the principles and concepts of the present invention and generally designated by the reference numeral 10 will be described.

As best illustrated in FIGS. 1 through 3, the combined bobber and hook-setting assembly 10 generally comprises a spherical member 11 including a first semi-spherical shell 14 having a first hole 12 being disposed through a wall thereof, and also includes a second semi-spherical shell 15 being securely and conventionally attached to the first semi-spherical shell 14 and having a second hole 13 being disposed through a wall thereof.

A grommet 16 is conventionally attached to the spherical member 11 and is adapted to connect to a fishing line 34. The grommet 16 includes a tubular insert 32 being securely and conventionally engaged in the first hole 12, and further includes a shaft 17 being rotatably disposed through said tubular insert 32, and also includes a flange 18 being integrally attached to a first end of the shaft 17, and further includes an eyelet 19 being integrally attached to a second end of the shaft 17 and being adapted to connect to the fishing line 34.

A reel assembly is disposed in the spherical member 11 and includes an elongate support member 20 having an end which is conventionally attached to an interior of the spherical member 11, and also includes a spool 21 being rotatably mounted upon the elongate support member 20, and further includes a flexible line 24 being carried about the spool 21 and being retractably extended through the second hole 13 of the spherical member 11 and being securely connected to a connector swivel 33 which is securely and conventionally connected to a baited hook 35. The spool 21 is disc-shaped and has an opening 22 centrally-disposed therethrough and also has a plurality of notches 23 being circumferentially-spaced and being disposed in a circumferential edge thereof. The reel assembly further includes a spring 25 being securely and conventionally seated in the opening 22 and being conventionally attached to the elongate support member 20 for rotating the spool 21 to take up the flexible line 24 about the spool 21, and also includes a spool-locking member 26 being pivotally and conventionally attached to the interior of the spherical member 11 and being removably received in the notches 23 to prevent rotation of the spool 21 by the spring 25. Each of the notches 23 is generally wedge-shaped with a first side being angled relative to a second side thereof. The spool-locking member 26 includes a shaft member 27 being pivotally and conventionally attached to the wall of the spherical member 11, and also includes a first finger member 28 being conventionally attached to an end of the shaft member 27 and extending generally perpendicular to the shaft member 27, and further includes a second finger member 29 also being conventionally attached to the end of the shaft member 27 and extending generally perpendicular to the shaft member 27 and counter weighting the first finger member 28 which is removably engaged in the notch 23. The second finger member 29 has a main portion 30 and a weighted end portion 31 which is angled relative to the main portion 30 for pivoting the first finger member 28 out of engagement with the notches 23. The first finger member 28 has a tapered end for engaging the notches 23.

In use, the user places the spherical member 11 upon a body of water with the flexible line 24 being disposed in the water and having a baited hook 35 attached thereto for catching fish. Upon a fish biting and pulling on the baited hook 35, the spool-locking member 26 pivots with the second finger member 29 counter weighting the first finger member 28 and causing the first finger member 28 to be disengaged from one of the notches 23 with the spring 25 causing the spool 21 to rotate and take up the flexible line 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the combined bobber and hook-setting assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A combined bobber and hook-setting assembly comprising:

a spherical member including a first semi-spherical shell having a first hole being disposed through a wall thereof, and also including a second semi-spherical shell being securely attached to said first semi-spherical shell and having a second hole being disposed through a wall thereof;

a grommet being attached to said spherical member and being adapted to connect to a fishing line, said grommet including a tubular insert being securely engaged in said first hole, and further including a shaft being rotatably disposed through said tubular insert, and also including a flange being attached to a first end of said shaft, and further including an eyelet being attached to a second end of said shaft and being adapted to connect to a fishing line; and a reel assembly being disposed in said spherical member and including an elongate support member being attached to an interior of said spherical member, and also including a spool being rotatably mounted upon said elongate support member, and further including a flexible line being carried about said spool and being retractably extended through said second hole of said spherical member and being connected to a connector swivel which is connected to a baited hook, said spool being disc-shaped and having an opening centrally-disposed therethrough and also having a plurality of notches being circumferentially-spaced and being disposed in circumferential edge thereof, said reel assembly further including a spring being securely seated in said opening and being attached to said elongate support member for rotating said spool to take up said flexible line about said spool, and also including a spool-locking member being pivotally attached to said spherical member and being removably received in said notches to prevent rotation of said spool by said spring.

2. The combined bobber and hook-setting assembly as described in claim 1, wherein each of said notches is generally wedge-shaped with a first side being angled relative to a second side thereof.

3. The combined bobber and hook-setting assembly as described in claim 2, wherein said spool-locking member includes a shaft member being pivotally attached to said spherical member, and also includes a first finger member being attached to an end of said shaft member and extending generally perpendicular to said shaft member, and further includes a second finger member also being attached to said end of said shaft member and extending generally perpendicular to said shaft member and counter weighting said first finger member which is removably engaged in said notches.

4. The combined bobber and hook-setting assembly as described in claim 3, wherein said second finger member has a main portion and a weighted end portion which is angled relative to said main portion for pivoting said first finger member out of engagement with said notches.

5. The combined bobber and hook-setting assembly as described in claim 4, wherein said first finger member has a tapered end for engaging said notches.

\* \* \* \* \*